(12) United States Patent
Kume (10) Patent No.: US 10,663,716 B2
(45) Date of Patent: May 26, 2020

(54) OPTICAL APPARATUS, PROCESSING APPARATUS, AND ARTICLE MANUFACTURING METHOD

(71) Applicant: CANON KABUSHIKI KAISHA, Tokyo (JP)

(72) Inventor: Masaharu Kume, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 417 days.

(21) Appl. No.: 14/935,547

(22) Filed: Nov. 9, 2015

(65) Prior Publication Data
US 2016/0139403 A1  May 19, 2016

(30) Foreign Application Priority Data

Nov. 13, 2014 (JP) ................................. 2014-231050
Oct. 21, 2015 (JP) ................................. 2015-207497

(51) Int. Cl.
*G02B 26/08* (2006.01)
*G02B 17/02* (2006.01)
(Continued)

(52) U.S. Cl.
CPC ........ *G02B 26/0816* (2013.01); *B23K 26/043* (2013.01); *G02B 7/1821* (2013.01);
(Continued)

(58) Field of Classification Search
CPC .............. B23K 26/043; B23K 26/0643; G02B 17/023; G02B 19/0019; G02B 19/0028;
(Continued)

(56) References Cited

U.S. PATENT DOCUMENTS 4,215,912 A    8/1980  Minoura
4,299,438 A *  11/1981 Minoura .............. G02B 26/129
                                                    359/205.1
(Continued)

FOREIGN PATENT DOCUMENTS

CN    101743497 A    6/2010
CN    203817621 U    9/2014
(Continued)

OTHER PUBLICATIONS

Office Action issued in Chinese Patent Application No. 201510764437.7 dated Aug. 1, 2017. English translation provided.
(Continued)

*Primary Examiner* — Tu B Hoang
*Assistant Examiner* — Diallo I Duniver
(74) *Attorney, Agent, or Firm* — Rossi, Kimms & McDowell LLP (57) ABSTRACT

An optical apparatus is provided. The apparatus comprises a rotatable reflecting member including a first reflecting surface and a second reflecting surface, an optical system configured to sequentially reflect, by a plurality of reflecting surfaces included therein, light reflected by the first reflecting surface and cause the light to be incident on the second reflecting surface, and an adjusting device configured to change a rotation angle of the reflecting member to adjust an optical path of light that is reflected by the second reflecting surface and exits the second reflecting surface.

21 Claims, 8 Drawing Sheets

(51) Int. Cl.
*G02B 19/00* (2006.01)
*B23K 26/04* (2014.01)
*G02B 7/182* (2006.01)
*G02B 26/12* (2006.01)

(52) U.S. Cl.
CPC ....... *G02B 17/023* (2013.01); *G02B 19/0019* (2013.01); *G02B 19/0028* (2013.01); *G02B 26/129* (2013.01)

(58) Field of Classification Search
CPC .. G02B 26/0816; G02B 7/1821; G02B 26/10; G02B 27/64; G02B 17/02; G02B 17/06; G02B 17/08; G02B 26/105; G02B 26/0833; G02B 7/182; G02B 5/08
USPC .............. 219/121.85, 121.8, 121.78, 121.74; 359/225.1, 857–863, 196.1, 221.1, 220.1, 359/197.1, 212.1, 213.1–214.1, 359/201.1–202.1
See application file for complete search history.

(56) References Cited

U.S. PATENT DOCUMENTS

| | | | | |
|---|---|---|---|---|
| 4,647,144 A | * | 3/1987 | Finkel | G02B 26/10 359/204.1 |
| 6,984,802 B2 | * | 1/2006 | Kuroiwa | B23K 26/0608 219/121.73 |
| 7,371,596 B2 | | 5/2008 | Warner et al. | |
| 8,338,745 B2 | | 12/2012 | Liu | |
| 9,366,970 B2 | | 6/2016 | Tanitsu | |
| 2001/0052659 A1 | * | 12/2001 | Nakai | H05K 3/0038 264/400 |
| 2002/0057504 A1 | | 5/2002 | Cheng | |
| 2006/0151449 A1 | | 7/2006 | Warner et al. | |
| 2010/0288740 A1 | | 11/2010 | Komiya et al. | |

FOREIGN PATENT DOCUMENTS

| | | | | |
|---|---|---|---|---|
| DE | 2825550 A1 | | 1/1979 | |
| FR | 2662515 A1 | * | 11/1991 | ........... G02B 26/105 |
| FR | 2662515 A1 | | 11/1991 | |
| GB | 2000321 A | | 1/1979 | |
| JP | S62105115 A | | 5/1987 | |
| JP | H0232316 A | | 2/1990 | |
| JP | H04315488 A | | 11/1992 | |
| JP | 2009208092 A | | 9/2009 | |
| JP | 4386137 B2 | | 12/2009 | |
| JP | 2011121119 A | | 6/2011 | |
| JP | 2014533377 A | | 12/2014 | |
| WO | 2013074033 A1 | | 5/2013 | |

OTHER PUBLICATIONS

Extended Search Report issued in European Appln. No. 15003083.1 dated Mar. 14, 2016.

Office Action issued in Japanese Appln. No. 2015-207497 dated May 24, 2019.

\* cited by examiner

OPTICAL APPARATUS, PROCESSING APPARATUS, AND ARTICLE MANUFACTURING METHOD

BACKGROUND OF THE INVENTION

Field of the Invention

The present invention relates to an optical apparatus, a processing apparatus, and an article manufacturing method.

Description of the Related Art

For example, Japanese Patent No. 4386137 and Japanese Patent Laid-Open No. 2011-121119 disclose light beam parallel shift mechanisms in a conventional laser processing apparatus. In Japanese Patent No. 4386137, a light beam is parallelly shifted by rotating a transparent member. In Japanese Patent Laid-Open No. 2011-121119, a light beam is parallelly shifted using two synchronized angle changing mirrors.

In the light beam parallel shift mechanism of Japanese Patent No. 4386137, however, since the parallel shift amount of the light beam is determined by the rotation angle and the length of the transparent member, the inertia in rotation becomes large, and it is therefore difficult to do desired light beam shift at a high speed. For example, assume a case in which a light beam parallel shift amount of 5.3 mm is attained by a rotation angle of ±10° of a transparent member (quartz glass n=1.45) by the method of Japanese Patent No. 4386137. In this case, the size of the transparent member is realistically designed to about 95 mm×16 mm×13 mm. As a result, the inertia is as large as 33,000 g·mm$^2$, and it is difficult to perform parallel shift at a high speed.

The technique of Japanese Patent Laid-Open No. 2011-121119 solves the problem of the large inertia of the rotating member. However, since it is difficult to accurately synchronize the two mirror rotation mechanisms in a high-speed operation, the angle of the exit light beam is not constant, and it is difficult to parallelly shift the light beam.

SUMMARY OF THE INVENTION

The present invention provides, for example, an apparatus advantageous in speed of adjustment of an optical path therein.

According to one aspect of the present invention, an optical apparatus is provided. The apparatus comprises a rotatable reflecting member including a first reflecting surface and a second reflecting surface, an optical system configured to sequentially reflect, by a plurality of reflecting surfaces included therein, light reflected by the first reflecting surface and cause the light to be incident on the second reflecting surface, and an adjusting device configured to change a rotation angle of the reflecting member to adjust an optical path of light that is reflected by the second reflecting surface and exits the second reflecting surface.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
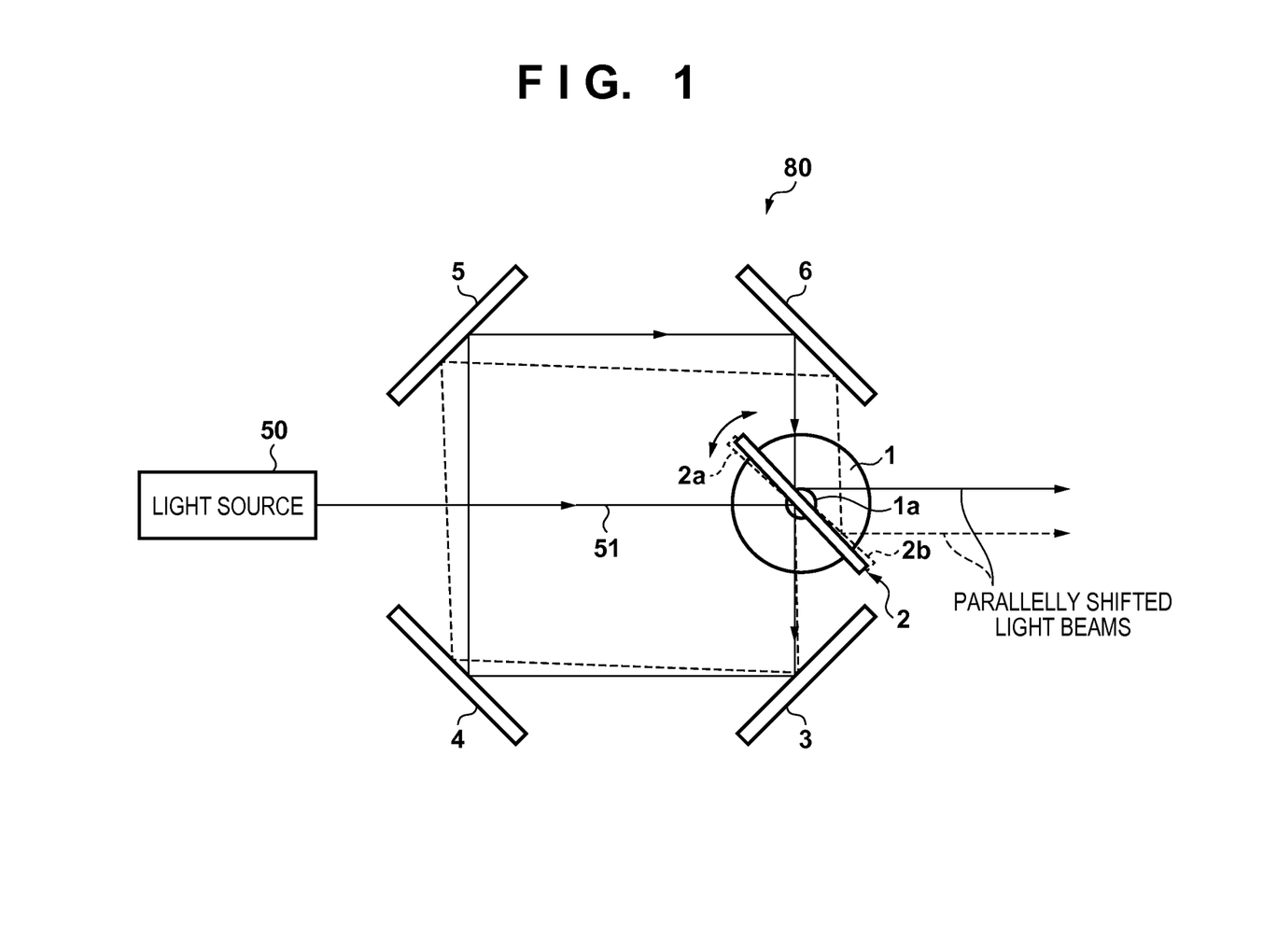
FIG. 1 is a view showing the arrangement of an optical apparatus according to a first embodiment.

FIG. 1 shows the arrangement of an optical apparatus according to a first embodiment. The optical apparatus according to this embodiment can control the optical path of exit light, for example, parallelly shift a light beam. A light beam parallel shift mechanism (more generally, a mechanism that performs adjustment of the optical path, typically, translation or translational movement of the optical path) according to this embodiment includes a mirror member 2 (also called a reflecting member) that reflects a light beam 51 from a light source 50. Note that in the following description, a case in which each reflecting surface can be regarded as a plane, and translation or translational movement of the optical path is performed will be exemplified. The mirror member 2 is made of, for example, glass, and includes a first reflecting surface 2a that receives the light beam 51 from the light source 50, and a second reflecting surface 2b on the opposite side. A high-reflection mirror coating can be applied to each of the first reflecting surface 2a and the second reflecting surface 2b. Note that the mirror member 2 may be formed into a prism-like shape, and the first reflecting surface 2a and the second reflecting surface 2b may be independent components. Here, a configuration in which the first reflecting surface and the second reflecting surface face opposite each other, are separate surfaces on the prism, and are independent surfaces, is advantageous in reducing an influence of heat from the incident light compared to the case where these are the same (planar) surface.

Figure 8:
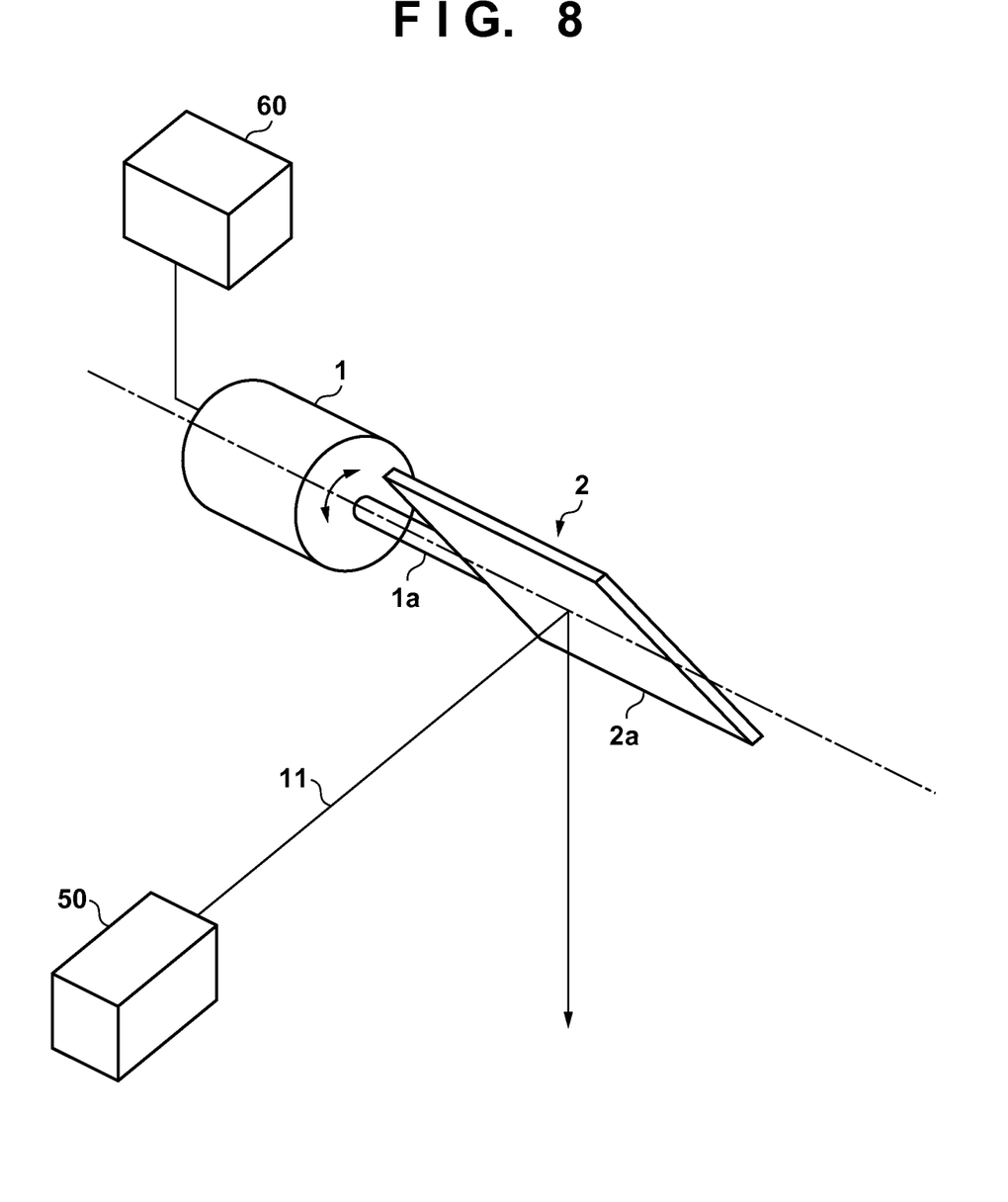
FIG. 8 is a view for explaining an example of the angle changing mechanism of the mirror member according to an embodiment.

The mirror member 2 is formed to be able to change the angle with respect to the light beam 51 so as to control the optical path of light that exits from the optical apparatus. FIG. 8 shows an example of the angle changing mechanism of the mirror member 2. As shown in FIG. 8, the mirror member 2 is axially supported by an output shaft 1a of a galvanomotor 1. A controller 60 (adjusting device) outputs a driving signal to the galvanomotor 1. A rotation driving unit (not shown) in the galvanomotor 1 rotates the mirror member 2 via the output shaft 1a by the driving amount according to the input driving signal. The mirror member 2 is thus rotatable. Here, the mirror member 2 is tilted by about 45° with respect to the light beam 51 from the light source 50.

The light beam parallel shift mechanism according to this embodiment includes an optical system 80 that reflects the light, which is incident on the mirror member 2 and is reflected by the mirror member 2, sequentially an even number of times by reflecting surfaces and then makes the light be incident on the mirror member 2 again. The optical system 80 according to this embodiment includes, for example, four mirrors 3, 4, 5, and 6 that are stationarily arranged to be symmetric with respect to the light beam 51. The light reflected by the first reflecting surface 2a of the mirror member 2 is sequentially reflected by the mirrors 3, 4, 5, and 6 and guided to the second reflecting surface 2b of the mirror member 2. The light finally reflected by the second reflecting surface 2b exits in almost the same direction as the light beam 51.

The angle of the exit light does not change even when the rotation angle of the mirror member 2 is changed. For this reason, the optical path of the light that is reflected by the reflecting surfaces of the mirror member 2 and exits can be adjusted by adjusting the rotation angle of the mirror member 2 by the controller 60.

Figure 2:
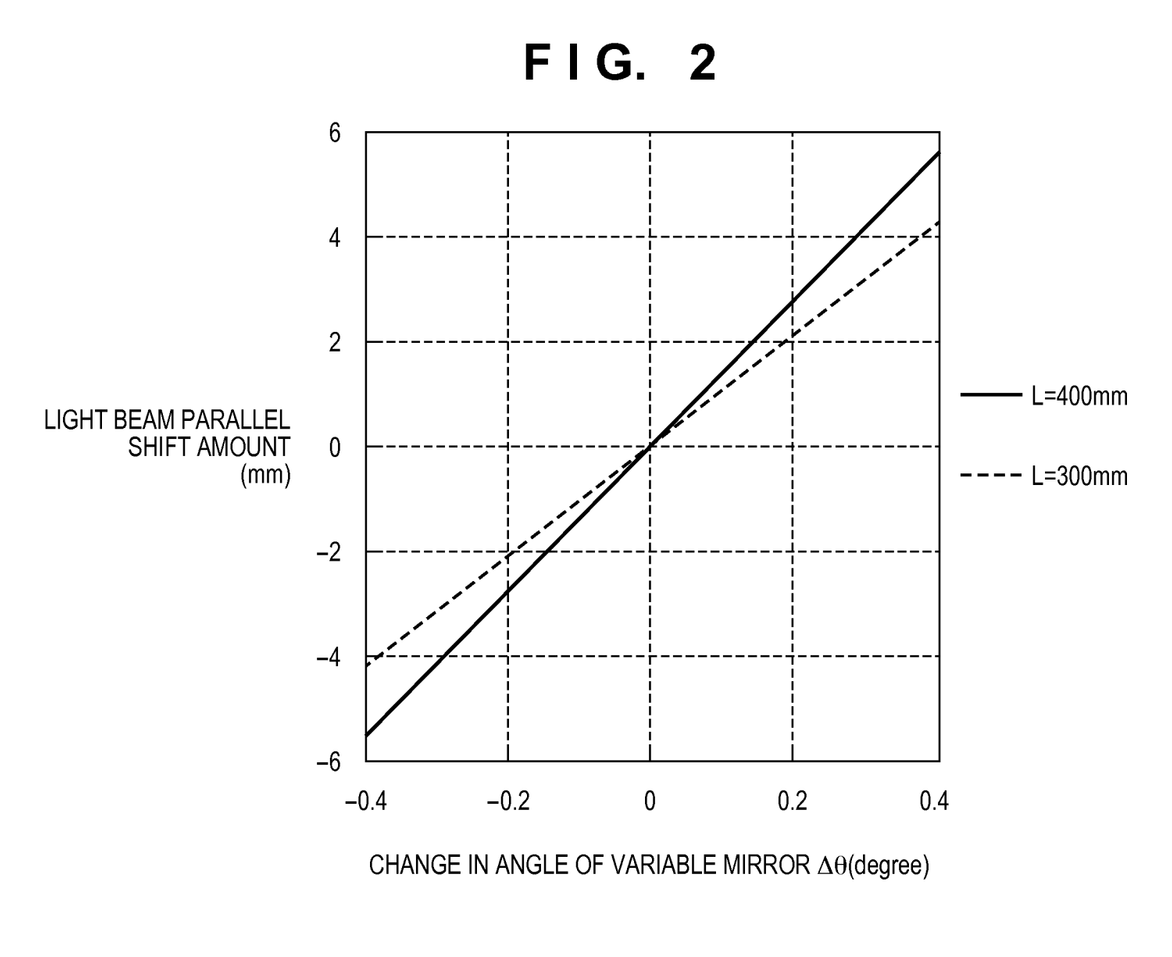
FIG. 2 is a graph showing the relationship between a light beam shift amount and the rotation angle of a mirror member in the first embodiment.

The relationship between the parallel light beam shift amount and a change in the rotation angle of the mirror member 2 will be described next. Consider a case in which the thickness of the mirror member 2 is assumed to be 0. FIG. 2 shows the relationship between the light beam shift amount and the change in the angle of the mirror member 2 in a case in which a peripheral distance L of a rectangle formed by the four mirrors 3, 4, 5, and 6 is 300 mm and in a case in which the peripheral distance L is 400 mm.

A light beam parallel shift amount $\Delta S$ is given by $$\Delta S = L \times \tan(2 \times \theta g) \quad (1)$$

where $\Delta \theta g$ is the angle change amount of the mirror member 2.

Equation (1) represents that the longer L is, the smaller the change in the angle of the mirror member 2 that can implement a large light beam parallel shift amount is. High-speed variable light beam shift can be performed by increasing L.

Figure 3:
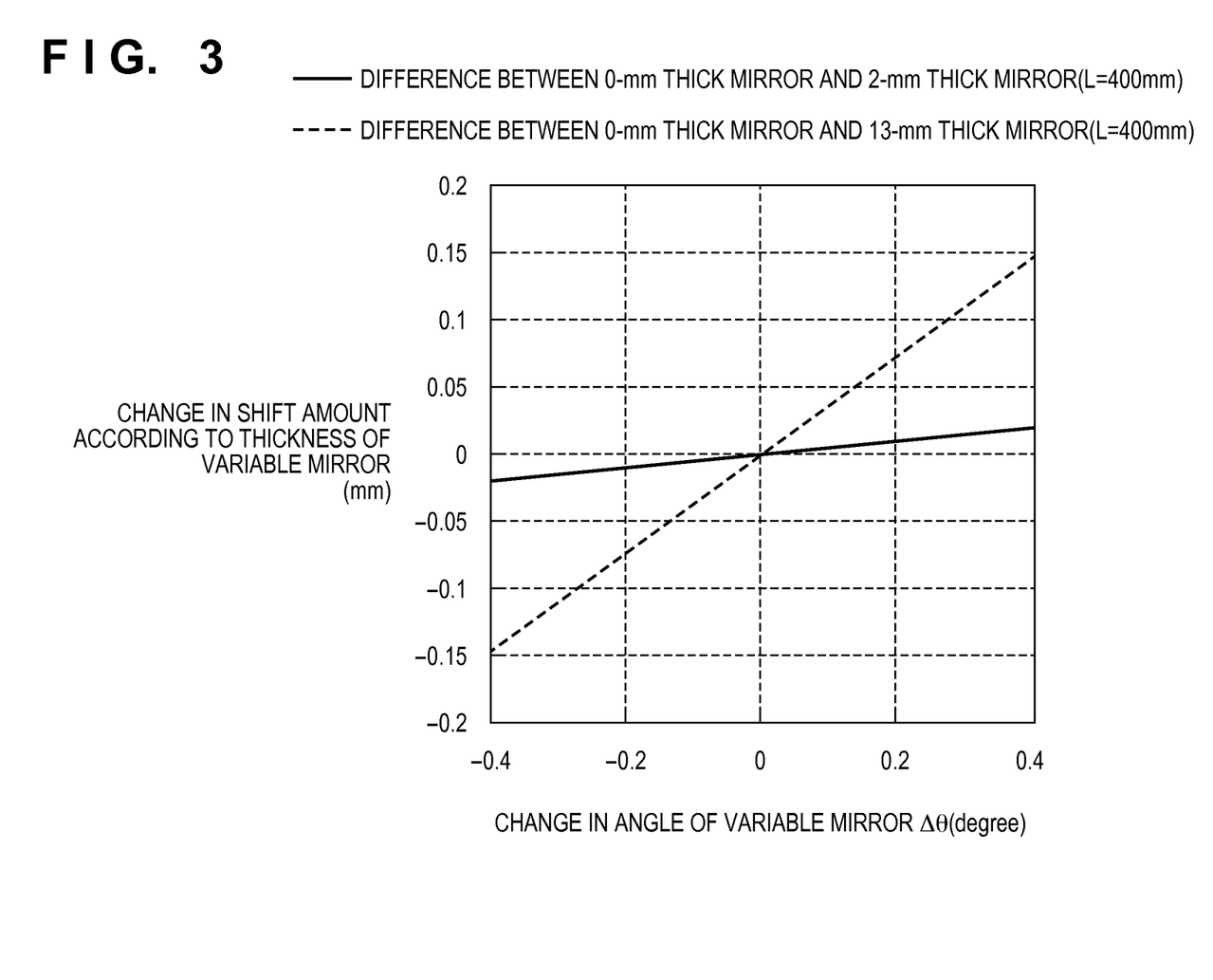
FIG. 3 is a graph showing the influence of the thickness of the mirror member on the light beam shift amount in the first embodiment.

Next assume a case in which the actual length of the mirror member 2 is taken into consideration. FIG. 3 shows the difference of the light beam parallel shift amount between a case in which the thickness of the mirror member 2 is assumed to be 0 and a case in which the actual thickness is taken into consideration. According to FIG. 3, if the thickness of the mirror member 2 is small with respect to L, the difference to the shift amount in the case in which the thickness of the mirror member 2 is 0 is small, and the light beam shift amount approximately matches equation (1). A necessary width W of the reflecting surface of the mirror member 2 is given by $$W = (D + Smax)/\sin(45 + \theta g) \quad (2)$$

where D is the width of the incident light beam to the shift mechanism, and Smax is the maximum shift amount.

According to the arrangement of this embodiment, as a result of design for implementing light beam parallel shift by 5.3 mm, the shift can be implemented by control within the range of ±0.5° in a case in which the thickness of the mirror member 2 is set to 2 mm (inertia=89 g·mm²), and L=300 mm. Hence, the speed can greatly be increased as compared to the conventional techniques.

As described above, according to this embodiment, a high-speed light beam parallel shift mechanism can be implemented by the arrangement using the angle changing mirror member 2 that receives light from the light source 50, and the four mirrors 3, 4, 5, and 6.

Second Embodiment

Figure 4:
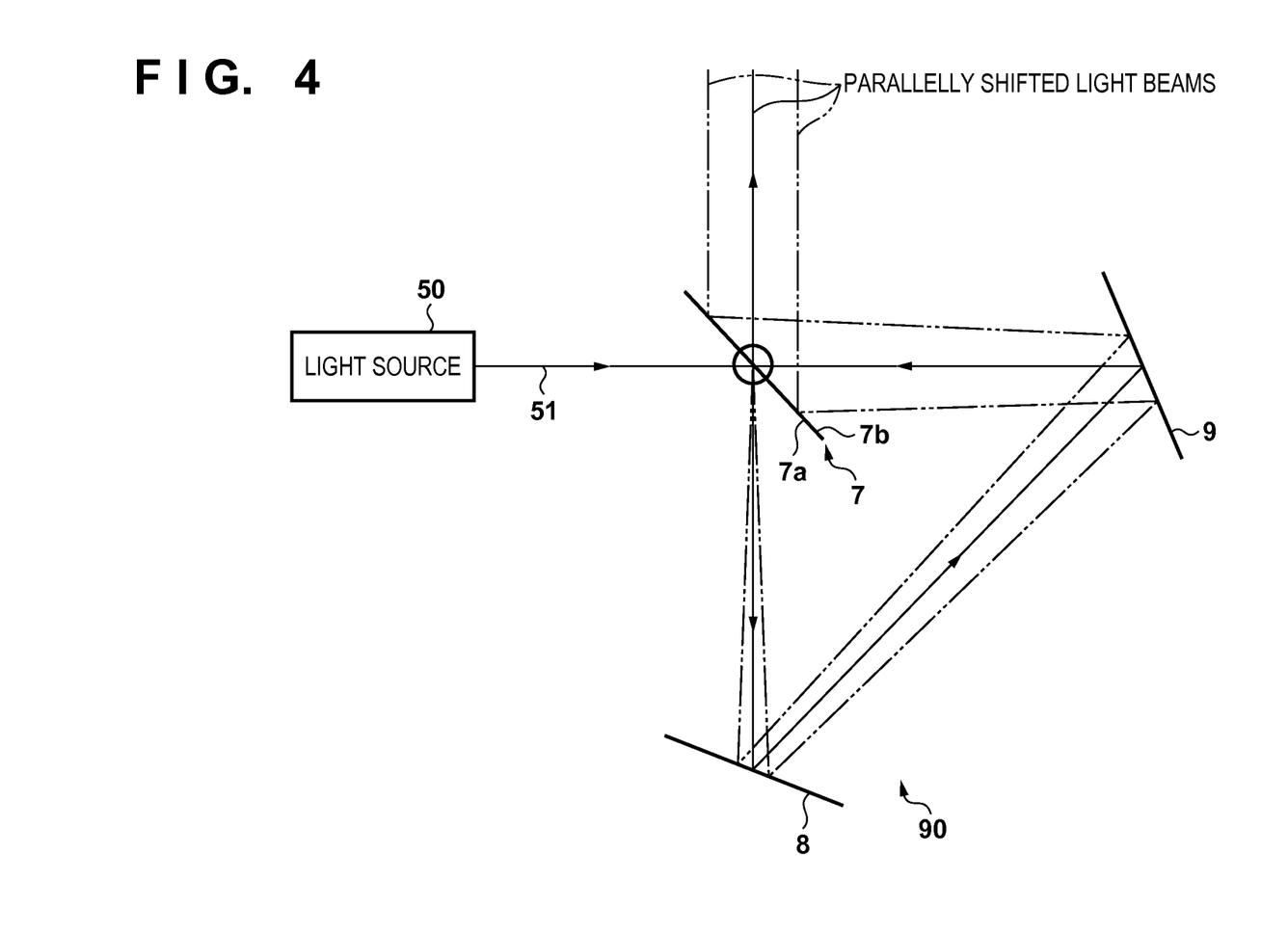
FIG. 4 is a view showing the arrangement of an optical apparatus according to a second embodiment.

FIG. 4 is a view showing the arrangement of an optical apparatus according to a second embodiment. As shown in FIG. 4, a mirror member 7 that reflects a light beam 51 from a light source 50 can have the same arrangement as the mirror member 2 according to the first embodiment. That is, the mirror member 7 is made of, for example, glass, and includes a first reflecting surface 7a that receives the light beam 51 from the light source 50, and a second reflecting surface 7b on the opposite side. High-reflection mirror coating can be applied to each of the first reflecting surface 7a and the second reflecting surface 7b. Note that the mirror member 7 may be formed into a prism-like shape, and the first reflecting surface 7a and the second reflecting surface 7b may be independent components. The mirror member 7 is formed to be able to change the angle, like the mirror member 2 according to the first embodiment. Here, the mirror member 7 is tilted by about 45° with respect to the light beam 51 from the light source 50.

An optical system 90 according to this embodiment includes two mirrors 8 and 9 that are stationarily arranged such that the optical path forms a triangle, as shown in FIG. 4. The light reflected by the first reflecting surface 7a of the mirror member 7 is sequentially reflected by the mirrors 8 and 9 and guided to the second reflecting surface 7b of the mirror member 7. The light finally reflected by the second reflecting surface 7b exits to one side, for example, in a direction perpendicular to the light beam 51. In this arrangement, light beam parallel shift according to equation (1) can be implemented by rotating the mirror member 7 by $\Delta \theta g$ by a galvanomotor.

As described above, according to this embodiment, a high-speed light beam parallel shift mechanism can be implemented by the arrangement using the angle changing mirror member 7 that receives light from the light source 50, and the two mirrors 8 and 9.

Third Embodiment

Figure 5:
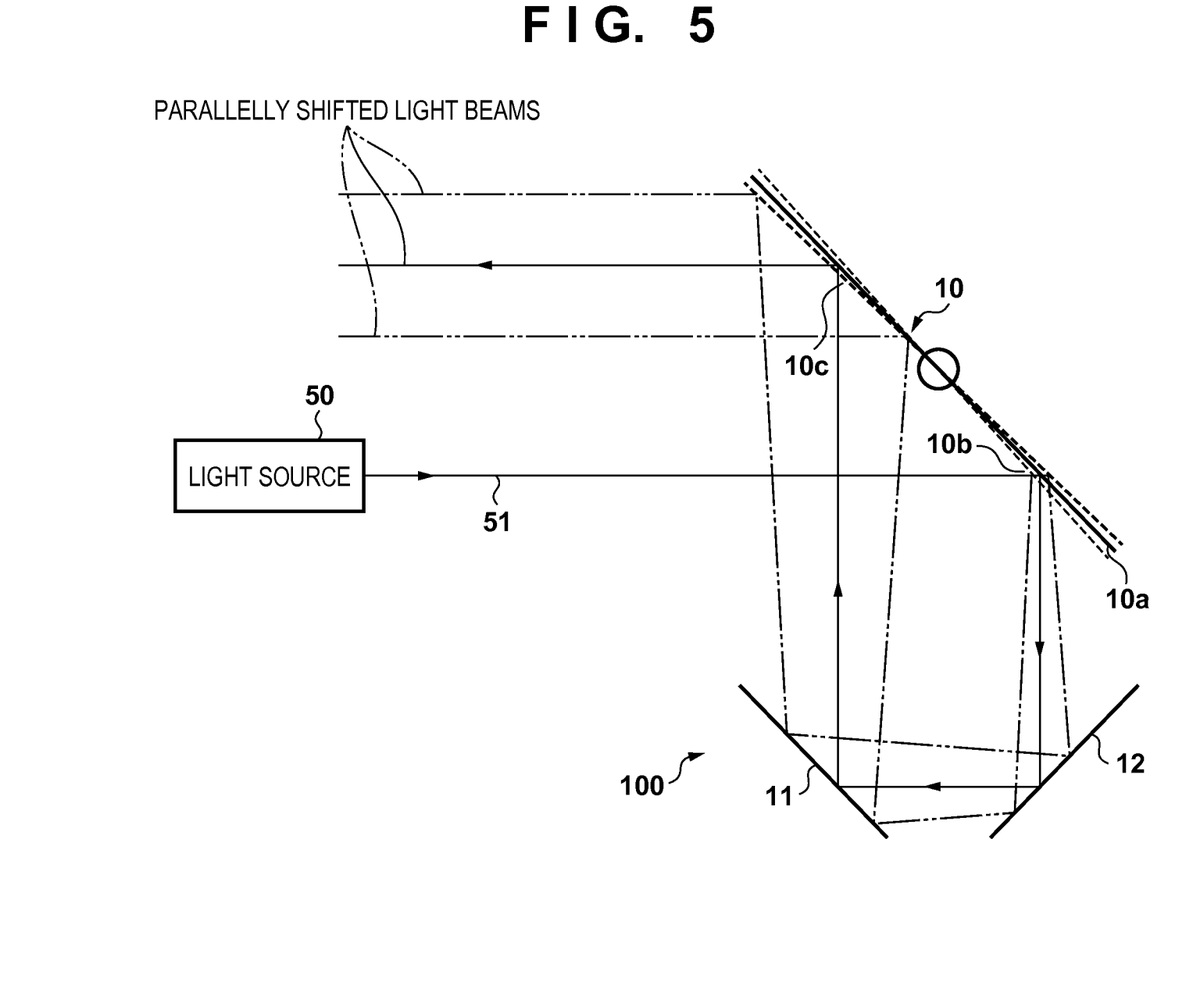
FIG. 5 is a view showing the arrangement of an optical apparatus according to a third embodiment.

FIG. 5 shows the arrangement of an optical apparatus according to a third embodiment. A mirror member 10 that reflects a light beam 51 from a light source 50 is formed to be able to change the angle, like the mirror member 2 according to the first embodiment. Here, the mirror member 10 is tilted by about 45° with respect to the light beam 51 from the light source 50.

An optical system 100 according to this embodiment includes two mirrors 11 and 12 that are stationarily arranged under the mirror member 10, as shown in FIG. 5. The light reflected by a first reflecting region 10b on a first surface 10a of the mirror member 10, which is the surface on the side of the light source 50, is sequentially reflected by the mirrors 11 and 12 and guided to a second reflecting region 10c on the first surface 10a of the mirror member 10. The light reflected by the second reflecting region 10c exits in a direction, for example, reversed by 180° with respect to the light beam 51. In this arrangement, light beam parallel shift according to equation (1) can be implemented by rotating the mirror member 10 by $\Delta \theta g$ by a galvanomotor.

As described above, according to this embodiment, a high-speed light beam parallel shift mechanism can be implemented by the arrangement using the angle changing mirror member 10 that receives light from the light source 50, and the two mirrors 11 and 12.

Fourth Embodiment

Figure 6:
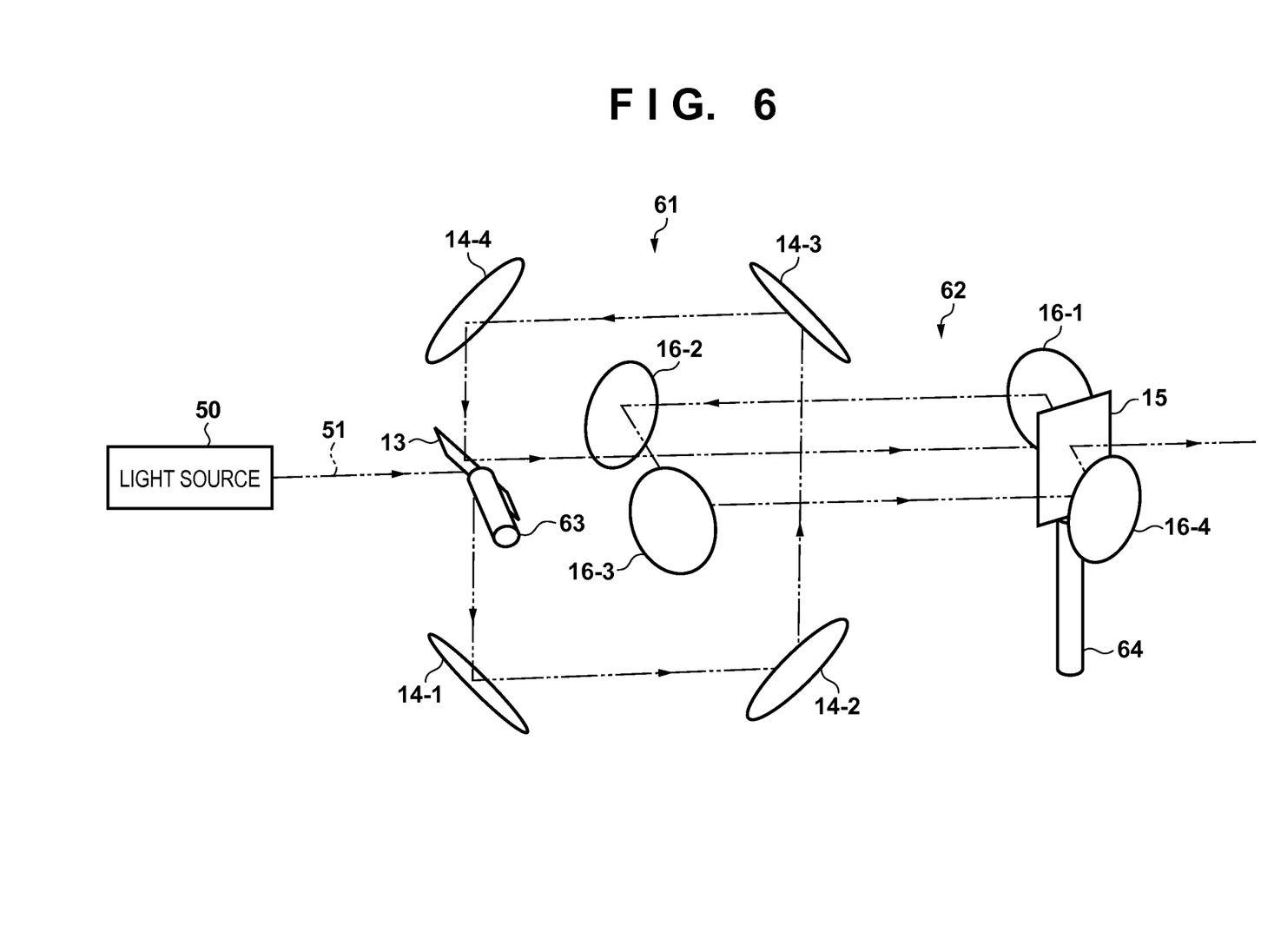
FIG. 6 is a view showing the arrangement of an optical apparatus according to a fourth embodiment.

FIG. 6 shows the arrangement of an optical apparatus according to a fourth embodiment. This arrangement is a combination of arrangements shown in the first embodiment (FIG. 1), and includes a first optical apparatus 61 that receives a light beam 51 from a light source 50, and a second optical apparatus 62 that receives exit light from the first optical apparatus 61.

The first optical apparatus 61 includes an angle changing mirror member 13 that reflects the light beam 51 from the light source 50. This corresponds to the mirror member 2 according to the first embodiment. The first optical apparatus 61 also includes mirrors 14-1, 14-2, 14-3, and 14-4 corresponding to the mirrors 3, 4, 5, and 6 according to the first embodiment, respectively.

The second optical apparatus 62 includes an angle changing mirror member 15 that reflects the light beam 51 from the light source 50. This corresponds to the mirror member 2 according to the first embodiment. The second optical apparatus 62 also includes mirrors 16-1, 16-2, 16-3, and 16-4 corresponding to the mirrors 3, 4, 5, and 6 according to the first embodiment, respectively.

The rotation axis of the mirror member 13 of the first optical apparatus 61 and the rotation axis of the mirror member 15 of the second optical apparatus 62 are not parallel and are arranged, for example, to be perpendicular to each other.

In the first optical apparatus 61, the incident light reflected by the first reflecting surface of the mirror member 13 is sequentially reflected by the mirrors 14-1, 14-2, 14-3, and 14-4 and guided to the second reflecting surface of the mirror member 13 on the opposite side of the first reflecting surface. The light reflected by the second reflecting surface is incident on the mirror member 15 of the second optical apparatus 62. In the second optical apparatus 62, the incident light reflected by the first reflecting surface of the mirror member 15 is sequentially reflected by the mirrors 16-1, 16-2, 16-3, and 16-4 and guided to the second reflecting surface of the mirror member 15 on the opposite side of the first reflecting surface. The light finally reflected by the second reflecting surface of the mirror member 15 exits in almost the same direction as the light beam 51.

As shown in FIG. 6, an arrangement in which a plane formed by the optical path on which the mirrors reflect light in the first optical apparatus 61 and a plane formed by the optical path on which the mirrors reflect light in the second optical apparatus 62 intersect each other may be employed. When the light beam parallel shift mechanisms are arranged so as to intersect each other, downsizing of the optical apparatus can be implemented.

Note that in the above example, an example in which the light beam parallel shift mechanisms of the first embodiment (FIG. 1) are arranged such that the shift directions become perpendicular to each other has been described. However, even if two light beam parallel shift mechanisms selected from the first to third embodiments are combined, light beam parallel shift can similarly freely be performed in the two-dimensional plane.

According to various embodiments described above, the optical apparatus includes a rotatable mirror member, and an optical system that receives light reflected by the mirror member and makes it exit in a predetermined direction. The optical system sequentially reflects the light an even number of times by the reflecting surfaces and makes the light be incident on the mirror member again. The light that is incident again is reflected by the mirror member, and thus exits in the predetermined direction. According to the examinations of the present inventor, the present invention cannot hold in an arrangement with an optical system that reflects light not an even number of times but an odd number of times.

Fifth Embodiment

Figure 7:
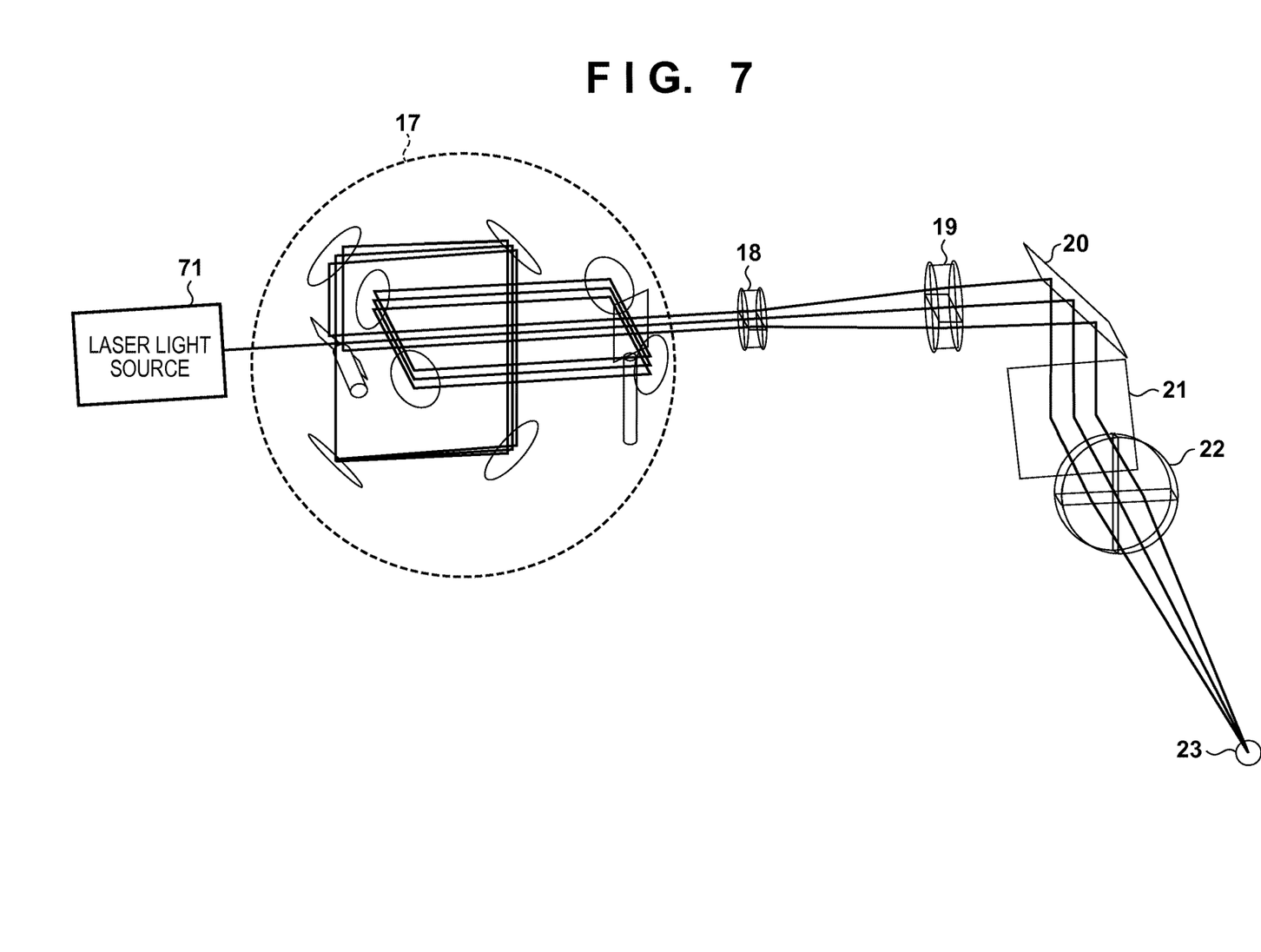
FIG. 7 is a view showing the arrangement of a processing apparatus according to a fifth embodiment.

An example of a processing apparatus including an optical element for guiding light that has exited from the optical apparatus described in the fourth embodiment to an object will be described below. FIG. 7 shows the arrangement of a laser processing apparatus according to a fifth embodiment. The laser processing apparatus according to this embodiment includes a light beam parallel shift mechanism 17 described in the fourth embodiment at the subsequent stage of a laser light source 71. Light beam enlarging systems 18 and 19 are arranged at the subsequent stage of the light beam parallel shift mechanism 17, thus enlarging the light beam shift amount/light beam system to necessary amounts. A condenser lens 22 is arranged at the subsequent stage of the light beam enlarging systems, and an object 23 arranged on the focal plane is irradiated with the condensed laser beam. The angles of mirrors 20 and 21 provided between the light beam enlarging system 19 and the condenser lens 22 can be adjusted so as to guide the light beam to a desired position on the object 23.

In this arrangement, the light beam parallel shift mechanism 17 parallelly shifts the light beam, thereby freely changing the angle of the laser beam that irradiates the object 23. As a result, tapered hole processing or cutting of a slant section can be performed.

Embodiment of Article Manufacturing Method

The processing apparatus according to above-described embodiment is usable for an article manufacturing method. The article manufacturing method can include a step of processing an object using the processing apparatus, and a step of processing the object processed in the step. The processing can include, for example, at least one of processing different from the above-described processing, conveyance, inspection, selection, assembly (imposition), and packaging. The article manufacturing method according to this embodiment is superior to a conventional method in at least one of the performance, quality, productivity, and production cost of the article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-231050, filed Nov. 13, 2014, and 2015-207497, filed Oct. 21, 2015, which are hereby incorporated by reference herein in their entirety.

What is claimed is:

1. An optical apparatus comprising:
a first reflecting member that is rotatable about a first axis and including a first reflecting surface and a second reflecting surface;
a first optical system including:
a first plurality of reflecting members including a first plurality of reflecting surfaces configured to sequentially reflect light reflected by the first reflecting surface of the first reflecting member to form a first optical path in a first plane, wherein one of the first optical system receives and reflects light reflected by the first reflecting surface of the first reflecting member to another of the first plurality of reflecting surfaces to guide light to be incident on the second reflecting surface of the first reflecting member;
a first adjusting device configured to change a rotation angle of the first reflecting member to adjust a second optical path of light that is reflected by and exits the second reflecting surface of the first reflecting member;
a second reflecting member that is rotatable about a second axis not parallel with the first axis and includes a third reflecting surface and a fourth reflecting surface, the third reflecting surface reflecting light reflected by the first plurality of reflecting surfaces and the second reflecting surface of the first reflecting member;
a second optical system including:
a second plurality of reflecting members including a second plurality of reflecting surfaces configured to sequentially reflect light reflected by the third reflecting surface of the second reflecting member to form a third optical path in a second plane,
wherein one of the second plurality of reflecting surfaces receives and reflects light reflected by the third reflecting surface of the second reflecting member to another of the second plurality of reflecting surfaces to guide light to be incident on the fourth reflecting surface of the second reflecting member; and
a second adjusting device configured to change a rotation angle of the second reflecting member to adjust a fourth optical path of light that is reflected by and exits the fourth reflecting surface of the second reflecting member,
wherein the first plane formed by the first optical path in the first optical system and the second plane formed by the third optical path in the second optical system intersect with each other.

2. The apparatus according to claim 1, wherein:
the second reflecting surface of the first reflecting member is on a side opposite the first reflecting surface of the first reflecting member, and
the fourth reflecting surface of the second reflecting member is on a side opposite the third reflecting surface of the second reflecting member.

3. The apparatus according to claim 1, wherein:
the first reflecting surface and the second reflecting surface of the first reflecting member, the third reflecting surface and the fourth reflecting surface of the second reflecting member, the first plurality of reflecting surfaces, and the second plurality of reflecting surfaces are planes, and
the first adjusting device and the second adjusting device are configured to translate the second and fourth optical paths, while the second and fourth optical paths are parallel respectively.

4. The apparatus according to claim 1, wherein:
the first plurality of reflecting surfaces are four reflecting surfaces, and
the second plurality of reflecting surfaces are four reflecting surfaces.

5. The apparatus according to claim 1, wherein:
the first plurality of reflecting surfaces are two reflecting surfaces, and
the second plurality of reflecting surfaces are two reflecting surfaces.

6. The apparatus according to claim 1, wherein the first optical system is configured to reflect:
the light reflected by the first reflecting surface of the first reflecting member sequentially an even number of times and direct the light to be incident on the second reflecting surface of the first reflecting member, and
the light reflected by the third reflecting surface of the second reflecting member sequentially an even number of times and direct the light to be incident on the fourth reflecting surface of the second reflecting member.

7. A processing apparatus comprising:
a light source; and
an optical apparatus comprising:
a first reflecting member that is rotatable about a first axis and including a first reflecting surface and a second reflecting surface;
a first optical system including:
a first plurality of reflecting members including a first plurality of reflecting surfaces configured to sequentially reflect light reflected by the first reflecting surface of the first reflecting member to form a first optical path in a first plane,
wherein one of the first plurality of reflecting surfaces receives and reflects light from the light source reflected by the first reflecting surface of the first reflecting member to another of the first plurality of reflecting surfaces to guide light to be incident on the second reflecting surface of the first reflecting member;
a first adjusting device configured to change a rotation angle of the first reflecting member to adjust a second optical path of light that is reflected by and exits the second reflecting surface of the first reflecting member;
a second reflecting member that is rotatable about a second axis not parallel with the first axis and includes a third reflecting surface and a fourth reflecting surface, the third reflecting surface reflecting light reflected by the first plurality of reflecting surfaces and the second reflecting surface of the first reflecting member;
a second optical system including:
a second plurality of reflecting members including a second plurality of reflecting surfaces configured to sequentially reflect light reflected by the third reflecting surface of the second reflecting member to form a third optical path in a second plane,
wherein one of the second plurality of reflecting surfaces receives and reflects light reflected by the third reflecting surface of the second reflecting member to another of the second plurality of reflecting surfaces to guide light to be incident on the fourth reflecting surface of the second reflecting member; and
a second adjusting device configured to change a rotation angle of the second reflecting member to adjust the fourth optical path of light that is reflected by and exits the fourth reflecting surface of the second reflecting member,
wherein the first axis plane formed by the first optical path in the first optical system and the second plane formed by the third optical path in the second optical system intersect with each other.

8. The apparatus according to claim 7, further comprising an optical element configured to direct light, that has exited the optical apparatus, to an object.

9. A method of manufacturing an article, the method comprising steps of:
irradiating light to an object using a processing apparatus; and
removing material from the object to manufacture the article,
wherein the processing apparatus includes:
the light source; and
an optical apparatus comprising:
a first reflecting member that is rotatable about a first axis and including a first reflecting surface and a second reflecting surface;
a first optical system including:
a first plurality of reflecting members including a first plurality of reflecting surfaces configured to sequentially reflect light reflected by the first reflecting surface of the first reflecting member to form a first optical path in a first plane,
wherein one of the first plurality of reflecting surfaces receives and reflects light from the light source reflected by the first reflecting surface of the first reflecting member to another of the first plurality of reflecting surfaces to guide light to be incident on the second reflecting surface of the first reflecting member;
a first adjusting device configured to change a rotation angle of the first reflecting member to adjust a second optical path of light that is reflected by and exits the second reflecting surface of the first reflecting member;
a second reflecting member that is rotatable about a second axis not parallel with the first axis and includes a third reflecting surface and a fourth reflecting surface, the third reflecting surface reflecting light reflected by the first plurality of reflecting surfaces and the second reflecting surface of the first reflecting member;
a second optical system including:
a second plurality of reflecting members including a second plurality of reflecting surfaces configured to sequentially reflect light reflected by the third reflecting surface of the second reflecting member to form a third optical path in a second plane,
wherein one of the second plurality of reflecting surfaces receives and reflects light reflected by the third reflecting surface of the second reflecting member to another of the second plurality of reflecting surfaces to guide light to be incident on the fourth reflecting surface of the second reflecting member; and
a second adjusting device configured to change a rotation angle of the second reflecting member to adjust a fourth optical path of light that is reflected by and exits the fourth reflecting surface of the second reflecting member,
wherein the first plane formed by the first optical path in the first optical system and the third plane formed by the second optical path in the second optical system intersect with each other.

10. The optical apparatus according to claim 1, wherein:
the first adjusting device is configured to change the rotation angle of the first reflecting member to shift, in a first direction, the second optical path of light that is reflected by the second reflecting surface, and
the second adjusting device is configured to change the rotation angle of the second reflecting member to shift, in a second direction different from the first direction, the fourth optical path of light reflected by the fourth reflecting surface.

11. The optical apparatus according to claim 1, wherein the first plane is not parallel to the first axis of the first reflecting member.

12. The optical apparatus according to claim 1, wherein the first plane and the second plane intersect at an intersecting line that is arranged between the first and the second reflecting members.

13. An optical apparatus comprising:
a first reflecting member that is rotatable about a first axis and including a first reflecting surface and a second reflecting surface;
four reflecting members including a first optical system including four reflecting surfaces configured to sequentially reflect light reflected by the first reflecting surface of the first reflecting member to form a first optical path in a first plane that guides light to be incident on the second reflecting surface of the first reflecting member;
a first adjusting device configured to change a rotation angle of the first reflecting member to adjust a second optical path of light that is reflected by and exits the second reflecting surface of the first reflecting member;
a second reflecting member that is rotatable about a second axis not parallel with the first axis and includes a third reflecting surface and a fourth reflecting surface, the third reflecting surface reflecting light reflected by the four reflecting surfaces of the first optical system and the second reflecting surface of the first reflecting member;
a second optical system including four reflecting surfaces including four reflecting surfaces configured to sequentially reflect light reflected by the third reflecting surface of the second reflecting member to form a third optical path in a second plane that guides light to be incident on the fourth reflecting surface of the second reflecting member; and
a second adjusting device configured to change a rotation angle of the second reflecting member to adjust a fourth optical path of light that is reflected by and exits the fourth reflecting surface of the second reflecting member,
wherein the first plane extends in a direction toward the second reflecting member as seen from the first reflecting member, and the second plane extends in a direction toward the first reflecting member as seen from the second reflecting member.

14. The apparatus according to claim 13, wherein:
the second reflecting surface of the first reflecting member is on a side opposite the first reflecting surface of the first reflecting member, and
the fourth reflecting surface of the second reflecting member is on a side opposite the third reflecting surface of the second reflecting member.

15. The apparatus according to claim 13, wherein:
the first reflecting surface and the second reflecting surface of the first reflecting member, the third reflecting surface and the fourth reflecting surface of the second reflecting member, the four reflecting surfaces of the first optical system, and the four reflecting surfaces of the second optical system are planes, and the first adjusting device and the second adjusting device are configured to translate the third optical path and the fourth optical path, respectively, while the third and fourth optical paths are parallel.

16. The optical apparatus according to claim 13, wherein:

the first adjusting device is configured to change the rotation angle of the first reflecting member to shift, in a first direction, the third optical path of light that is reflected by the second reflecting surface, and the second adjusting device is configured to change the rotation angle of the second reflecting member to shift, in a second direction different from the first direction, the fourth optical path of light reflected by the fourth reflecting surface.

17. The optical apparatus according to claim 13, wherein the first plane is not parallel to the first axis of the first reflecting member.

18. The apparatus according to claim 13, wherein:

the first plane and the second plane intersect with each other.

19. The optical apparatus according to claim 18, wherein the first plane and the second plane intersect at an intersecting line that is arranged between the first and the second reflecting members.

20. A processing apparatus comprising:

a light source; and an optical apparatus comprising:

a first reflecting member that is rotatable about a first axis and including a first reflecting surface and a second reflecting surface;

four reflecting members including a first optical system including four reflecting surfaces configured to sequentially reflect light reflected by the first reflecting surface of the first reflecting member to form a first optical path in a first plane that guides light to be incident on the second reflecting surface of the first reflecting member;

a first adjusting device configured to change a rotation angle of the first reflecting member to adjust a second optical path of light that is reflected by and exits the second reflecting surface of the first reflecting member;

a second reflecting member that is rotatable about a second axis not parallel with the first axis and includes a third reflecting surface and a fourth reflecting surface, the third reflecting surface reflecting light reflected by four reflecting surfaces of the first optical system and the second reflecting surface of the first reflecting member;

a second optical system including four reflecting members including four reflecting surfaces configured to sequentially reflect light reflected by the third reflecting surface of the second reflecting member to form a third optical path in a second plane that guides light to be incident on the fourth reflecting surface of the second reflecting member; and a second adjusting device configured to change a rotation angle of the second reflecting member to adjust a fourth optical path of light that is reflected by and exits the fourth reflecting surface of the second reflecting member, wherein the first plane extends in a direction toward the second reflecting member as seen from the first reflecting member, and the second plane extends in a direction toward the first reflecting member as seen from the second reflecting member.

21. A method of manufacturing an article, the method comprising steps of:

irradiating light to an object using a processing apparatus; and removing material from the object to manufacture the article, wherein the processing apparatus includes:

a light source; and an optical apparatus comprising:

a first reflecting member that is rotatable about a first axis and including a first reflecting surface and a second reflecting surface;

a first optical system including four reflecting members including four reflecting surfaces configured to sequentially reflect light reflected by the first reflecting surface of the first reflecting member to form a first optical path in a first plane that guides light to be incident on the second reflecting surface of the first reflecting member;

a first adjusting device configured to change a rotation angle of the first reflecting member to adjust a second optical path of light that is reflected by and exits the second reflecting surface of the first reflecting member;

a second reflecting member that is rotatable about a second axis not parallel with the first axis and includes a third reflecting surface and a fourth reflecting surface, the third reflecting surface reflecting light reflected by the four reflecting surfaces and the second reflecting surface of the first reflecting member;

a second optical system including four reflecting members including four reflecting surfaces configured to sequentially reflect light reflected by the third reflecting surface of the second reflecting member to form a third optical path in a second plane that guides light to be incident on the fourth reflecting surface of the second reflecting member; and a second adjusting device configured to change a rotation angle of the second reflecting member to adjust a fourth optical path of light that is reflected by and exits the fourth reflecting surface of the second reflecting member, wherein the first plane extends in a direction toward the second reflecting member as seen from the first reflecting member, and the second plane extends in a direction toward the first reflecting member as seen from the second reflecting member.

* * * * *